HYDRAULIC LIFTING DEVICE WITH WEIGHT ESTIMATOR

Original Filed Aug. 7, 1968 2 Sheets-Sheet 1

ALOIS JOSEPH SMIEJA - INVENTOR.

BY

Alois Joseph Smieja

HYDRAULIC LIFTING DEVICE WITH WEIGHT ESTIMATOR

Original Filed Aug. 7, 1968 2 Sheets-Sheet 2

ALOIS JOSEPH SMIEJA - INVENTOR.

BY

Alois Joseph Smieja

United States Patent Office

Re. 27,234
Reissued Nov. 9, 1971

27,234

HYDRAULIC LIFTING DEVICE WITH WEIGHT ESTIMATOR

Alois J. Smieja, Nehalem, Oreg. 97131

Original No. 3,456,749, dated July 22, 1969, Ser. No. 750,976, Aug. 7, 1968. Application for reissue Apr. 2, 1970, Ser. No. 25,306
Int. Cl. G01g *5/04, 19/10*
U.S. Cl. 177—146 12 Claims

Matter enclosed in heavy brackets [ ] appears in the original patent but forms no part of this reissue specification; matter printed in italics indicates the additions made by reissue.

ABSTRACT OF THE DISCLOSURE

A hydraulic lifting device, with a large diameter minimum travel piston sleeve, used for balancing or estimating loads in trucks, trailers or places where small clearances are involved and no stationary scales are available to prevent hazardous over-loading or over-balancing. A check valve limits the travel of the piston sleeve and closes a pressure chamber so that a stable pressure reading or signal can approximate the load or balance this device is lifting.

Summary of the invention

The subject of the invention is a hydraulic lifting device with a weight estimator for estimating loads on trucks, trailers or places where small clearances are involved. The device comprises a fixed piston and a movable piston sleeve defining a pressure chamber to which is connected a remote source of pressurized fluid and a pressure reading or signaling device used for making the weight determination. A check valve limits the travel of the piston sleeve and closes the pressure chamber so that a stable pressure reading may be obtained.

Detailed description

This hydraulic lifting device was invented for the purpose of determining the approximate load and balance on any load carrying contrivance so as to prevent hazard and inconvenience in isolated areas where conventional stationary weighing devices are not available or practical. This hydraulic lifting device is designed to be used in places where there is a minimum clearance for mounting and a fraction of an inch or more lift is desired such as between any load containing apparatus on any load carrying contrivance and the framework of the load carrying contrivance. This hydraulic lifting device may be used in a portable manner or more than one can be used to estimate the load or balance of any portion or portions of any load carrying contrivance. This hydraulic lifting device can be manufactured from pre-cast or pressed machined metal, any other durable material or a combination thereof.

Figure 1:
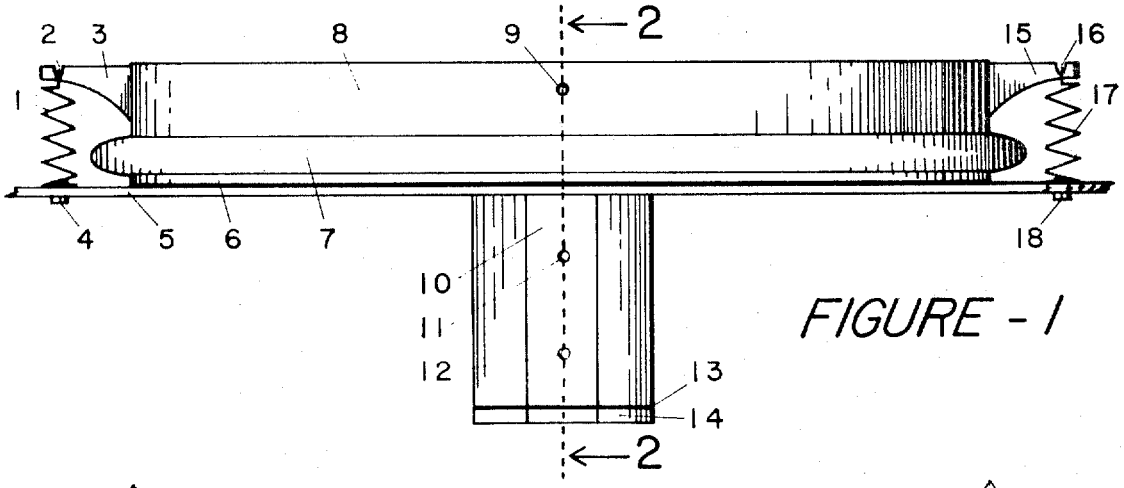
FIGURE 1 shows an assembled and mounted edge view of the hydraulic lifting device.
Figure 2:
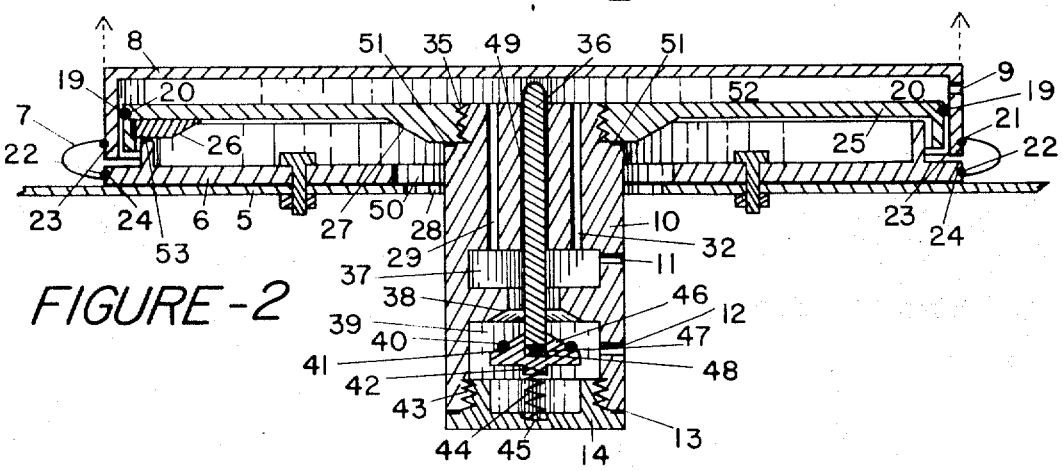
FIGURE 2 is a sectional view of the hydraulic lifting device showing the piston sleeve in an inactive position with the check-valve open.
Figure 3:
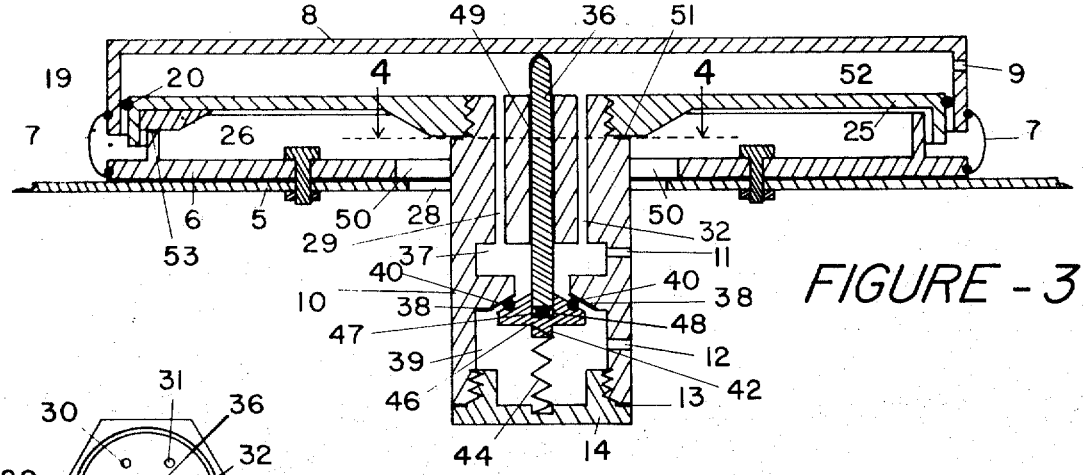
FIGURE 3 is a sectional view of the hydraulic lifting device showing the piston sleeve in an expanded position with the check valve closed.

FIGURE 1 shows an edge view wherein the hydraulic lifting device is shown mounted onto a conventional base 5. Bolt 4 fastens spring 1 to conventional base 5. Spring 1 is hooked into slot 2 of ear 3 which is a part of piston sleeve 8. Bolt 18 fastens spring 17 to conventional base 5. Spring 17 is hooked into slot 16 of ear 15 which is a part of piston sleeve 8. The purpose of springs 1 and 17 is to force piston sleeve 8 into its inactive position as shown in FIGURE 2. Check valve assembly 10 is fastened to piston 25 as shown in FIGURES 2 and 3 and extends below conventional frame 5. Dust baffle 7 is fastened to piston sleeve 8 and mounting base 6 as shown in FIGURES 2 and 3 to prevent dust and other foreign matter from entering the hydraulic lifting device. Pressure port 11 in check valve assembly 10 is for the purpose of installing a pressure reading or signaling device. Port 12 in check valve assembly 10 is for the purpose of installing a hydraulic line to operate the hydraulic lifting device. Gasket 13 seals check valve assembly cap 14 which is removable from check valve assembly 10 for the purpose of servicing check valve assembly 10. Bleeder port 9 in piston sleeve 8 is for the purpose of installing a conventional pressure relief safety valve which is also used for bleeding air from the lift chamber 52 shown in FIGURES 2 and 3.

FIGURE 2 is a sectional view taken from the plane of dotted line 2—2 shown in FIGURE 1. FIGURE 2 shows the hydraulic lifting device in an inactive position. Springs 1 and 17 shown in FIGURE 1 holds piston sleeve 8 down against mounting base 6 which compresses dust baffle 7 which is fastened on the upper edge to piston sleeve 8 by snap ring 21 which fits into snap ring groove 23 and is fastened on its lower edge to mounting base 6 by snap ring 22 which fits into snap ring groove 24. This dust baffle and the snap rings can be manufactured of any suitable flexible material.

Bleeder port 9 in piston sleeve 8 opens into lift chamber 52 thereby permitting a conventional pressure release safety valve to be installed to prevent excessive pressure in lift chamber 52 and to permit air bleeding of lift chamber 52.

Soft O-ring 19 fits into O-ring groove 20 in piston 25 for the purpose of sealing piston sleeve 8 against piston 25 so as to prevent hydraulic fluid leakage and permit piston sleeve 8 to travel freely.

Piston 25 rests on mounting base 6 and is prevented from turning by stop 26 which is fitted into slot 53 which is described in more detail hereinafter and more clearly shown in FIGURE 6. Check valve assembly 10 is fastened to piston 25 by threads 35 in piston shoulder 27 and sealed with gasket 51.

Mounting base 6 can be secured to any conventional base 5 by bolting or welding. Hole 50 in mounting base 6 permits mounting from underneath conventional base 5 in places of minimum clearances.

Check valve stem 36, which fits into cylinder hole 48 in check valve head 46, is held against the head of piston sleeve 8 by check valve spring 44 which is secured on check valve head 46 by spring holder 42 and is secured in check valve cap 14 by spring seat 45. Check valve cap 14 is threaded into check valve assembly 10 and sealed with gasket 13. The purpose of soft washer 47 which fits in cylinder hole 48 underneath check valve stem 36 will be described in detail hereinafter and is more clearly shown in FIGURE 7. Check valve head O-ring 40 is secured to check valve head 46 by O-ring groove 41. Check valve stem 36 slides on bushing 49 to prevent wear to check valve assembly 10.

Figure 4:
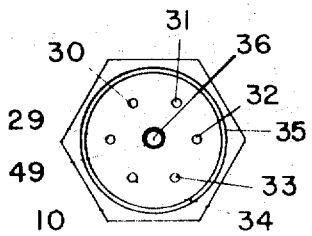
FIGURE 4 is a sectional view of the hydraulic lifting device check valve assembly.

Port 12 is for the purpose of injecting hydraulic fluid into the check valve assembly. Port 12 is open into lower assembly. Port 12 is open into lower chamber 39 which (when check valve head 46 is in open position) is open into pressure chamber 37 which is open into lift chamber 52 by way of ports 29, 30, 31, 32, 33 and 34 (ports 30, 31, 33 and 34 are shown in FIGURE 4).

Port 11 is open into pressure chamber 37 for the purpose of installing a pressure reading or signaling device.

FIGURE 3 is the same sectional view as FIGURE 2 showing the hydraulic lifting device in its expanded position when hydraulic pressure is applied.

When hydraulic fluid enters port 12 under pressure it flows into lower chamber 39, then around check valve head 46 in open position (FIGURE 2), then into pressure chamber 37, then thru ports 29, 30, 31, 32, 33 and 34 (FIGURE 4) into lift chamber 52. As hydraulic pressure increases in lift chamber 52 piston sleeve 8 moves upward sliding on O-ring 19 thereby permitting check valve stem 36 and check valve head 46 to move upward due to the force applied by check valve spring 44. Check valve head 46 attains the extent of its upward travel when O-ring 40 contacts check valve head seat 38 thereby stopping the hydraulic flow from lower chamber 39 to pressure chamber 37.

The length of the check valve stem can be varied to regulate the distance of travel desired. A shorter check valve stem will permit the check valve head to close more readily limiting the travel of the piston sleeve, while a longer stem will delay the closing of the check valve thereby permitting the piston sleeve to travel a greater distance.

After the check valve head 46 is closed the pressuure in lower chamber 39 could exceed the pressure in pressure chamber 37 thereby causing O-ring 40 to compress against shoulder 38. Soft washer 47 will be designed so as to compensate with an equal amount of compression thereby preventing check valve stem 36 from causing any lift on piston sleeve head 8.

When check valve head 46 is closed a constant pressure will be maintained in pressure chamber 37 permitting a pressure reading or an activation of a signaling device by a conventional apparatus connected to port 11 thereby determining the approximate weight or balance of the load the piston sleeve 8 is lifting.

Dust baffle 7 is shown in FIGURE 3 in an expanded position when piston sleeve 8 is in its expanded position.

FIGURE 4 is a sectional view of check valve assembly 10 taken from the plane shown by dotted line 4—4 in FIGURE 3. Ports 29, 30, 31, 32, 33 and 34 are so spaced as to acquire immediate dispersement of hydraulic fluid in lift chamber 52 and to eliminate possible maintenance with a fewer number of ports. FIGURE 4 shows threads 35 in relation to gasket 51 area shown in FIGURES 2 and 3. FIGURE 4 shows the upper end of check valve stem 36 and bushing 49.

Figure 5:
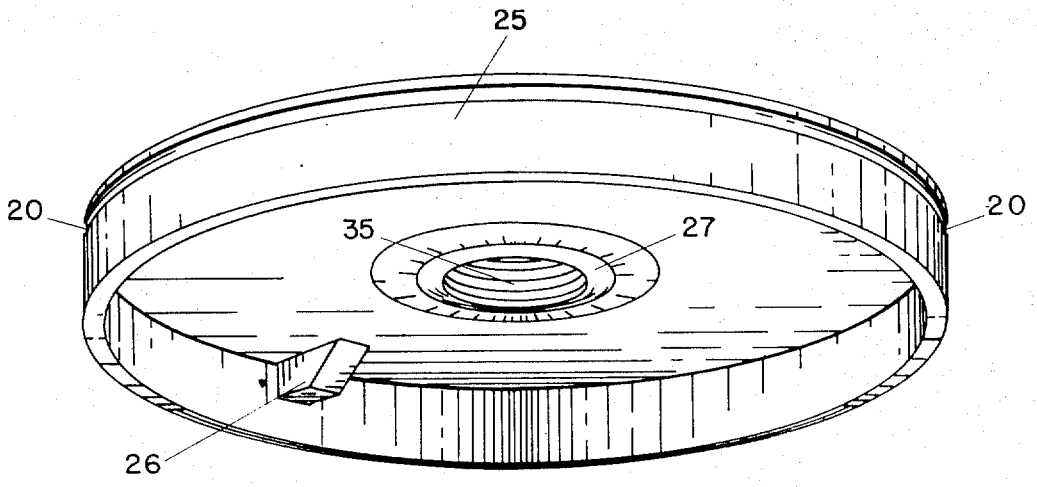
FIGURE 5 is a perspective view of the hydraulic lifting device piston.
Figure 6:
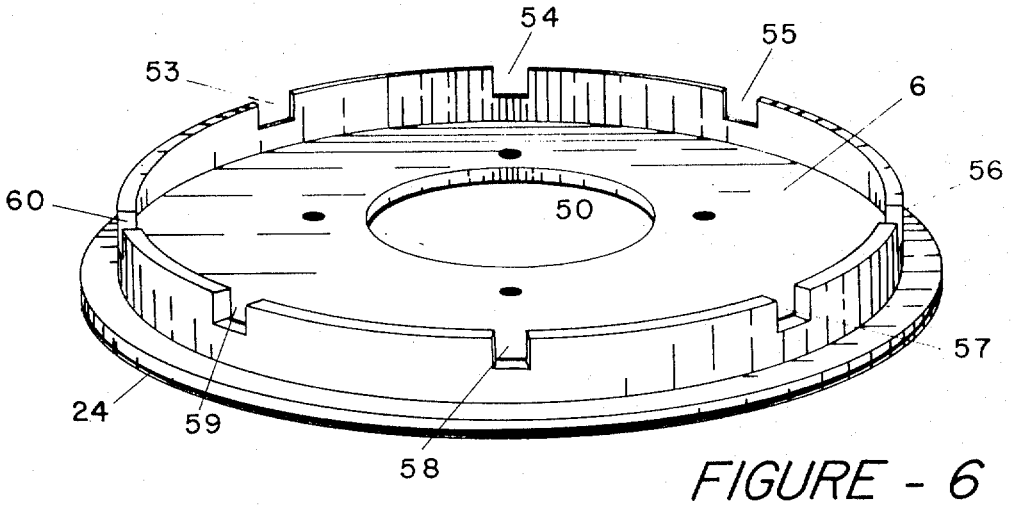
FIGURE 6 is a perspective view of the hydraulic lifting device mounting base.

FIGURE 5 is a perspective view showing piston 25 which rests on mounting base 6 which is showwn in FIGURE 6. Stop 26 which is shown in FIGURES 2 and 3 resting in slot 53 may also be placed in other positions as described hereinafter. O-ring groove 20 is placed near the top of piston 25 to permit maximum travel of piston sleeve 8. Piston shoulder 27 with threads 35 and flat surface for sealing with gasket 51 is for the purpose of connecting check valve assembly 10 to piston 25.

FIGURE 6 is a perspective view of mounting base 6 containing slots 53, 54, 55, 56, 57, 58, 59 and 60 wherein stop 26 may be alternately placed to provide varied positions for check valve assembly 10 after it is threaded into piston 25. In places with minimum clearance in the structural parts of a conventional mounting base it may become necessary to vary the position of ports 11 and 12 which are in check valve assembly 10 so that hydraulic lines, pressure reading equipment lines and signaling device lines may be more easily connected to check valve assembly 10. Therefore when check valve assembly 10 is secured to piston 25, piston 25 may be rotated and fixed in any of 8 positions by placing stop 26 in any one of slots 53, 54, 55, 56, 57, 58, 59 or 60. Stop 26 also serves the purpose of a holding device for piston 25 while check valve assembly 10 is being threaded into or out of piston 25 thereby eliminating the necessity of disassembly the hydraulic lifting device when check valve assembly 10 may need servicing.

Hole 50 in mounting base 6 permits check valve assembly 10 to protrude below conventional base 5 thru hole 28 in conventional base 5. Hole 50 also provides access for easy mounting of mounting base 6 in places where minimum clearances are involved and it may become necessary to secure the hydraulic lifting device from underneath conventional base 5. Snap ring groove 24 in mounting base 6 holds snap ring 22 which is on lower edge of dust baffle 7 as shown in FIGURES 2 and 3.

Figure 7:
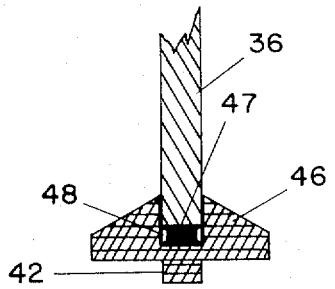
FIGURE 7 is an enlarged sectional view of the hydraulic lifting device check valve head assembly.

FIGURE 7 is an enlarged sectional view of check valve head 46 and check valve stem 36. Soft washer 47 is so designed to remain centered in cylinder *hole* 48 and permit soft washer 47 to compress or expand as check valve stem 36 slides inside cylinder 48 due to pressure differential in chambers 37 and 39 as hereinbefore described. Spring holder 42 is a cast or machined part of check valve head 46.

Although this hydraulic lifting device was primarily invented to fit between the 2 or 3 inch clearance between log bunkers and the frame of a log truck, its use will be varied in industry where load carrying contrivances and minimum clearances are involved.

I claim:

1. A hydraulic lifting device including its integral parts, one of which is a check valve assembly and its integral parts containing a valve stem which is separate from the valve head and fits into a valve head cylinder, said valve stem also having a rounded end to prevent fraying from constanct contact with a piston sleeve, the valve head having an O-ring, a cylinder in said valve head, a compressible washer so designed as to maintain a center position in the cylinder wherein it rests and further designed to compress in a manner compensatory to the compression of the valve O-ring, an O-ring groove in the valve head, a threaded valve assembly cap with a spring seat therein, a valve spring, a spring holder on the valve head, [a port used to attach a hydraulic injection system with which to operate said hydraulic lifting device,] a chamber with a hydraulic fluid access port and valve seat shoulder therein containing the valve head and valve spring, a pressure chamber wherein a stable pressure may be maintained by the closing of the valve head against the valve [head] seat shoulder for the purpose of attaching a pressure reading or signaling device to the port therein, [six] ports leading from the pressure chamber to a lift chamber [and finally,] the check valve assembly [which contains] *having* threads that fasten said assembly into a stable piston, said stable piston containing a threaded shoulder whereon the check valve assembly is fastened and sealed, an O-ring groove and an O-ring on the piston, a stop on this piston for altering the position of said piston by placing said stop in any one of [eight] *several* slots in a mounting base, a snap ring groove in the mounting base, an access hole in the mounting base, a piston sleeve with two slotted ears and a snap ring groove, a flexible dust baffle with two snap rings attached thereto and a bleeder port which is also used as a safety pressure release port, the piston sleeve and piston being designed in a flat thin manner with a large diameter so as to permit the manufacture of a thin hydraulic lifting device wherein the piston sleeve moves instead of the piston.

*2. A hydraulic lifting device comprising:*

*pressure chamber means including cylindrical hydraulic*

*piston and piston sleeve means having a sealingly slidable interfitting relation and a flat disc-like configuration with a diameter several times the total height thereof enabling lateral insertion in the small clearance between a truck frame and load for raising the load through a limited vertical distance less than the height of said piston and piston sleeve means,*

*and a check valve assembly depending centrally from the underside of the lower one of said piston and piston sleeve means, said assembly having a diameter less than the diameter of the means from which it depends for reception below the level at which said last mentioned means is supported,*

*said check valve assembly including a hydraulic check valve providing an inlet for hydraulic fluid into said pressure chamber means and a check valve stem for operating said check valve, said stem extending into operative relation with the opposite one of said piston and piston sleeve means for closing said check valve when said load is raised through said limited vertical distance.*

*3. A hydraulic lifting device comprising:*

*pressure chamber means including a cylindrical upwardly extending hydraulic piston means, and a piston sleeve means slidingly received over said piston means and adapted to move vertically thereabove as hydraulic fluid under pressure is introduced into the chamber inside said sleeve means above said piston means, said piston means and said sleeve means each having a flat disc-like configuration with a diameter several times its height enabling lateral insertion of said pressure chamber means between a truck frame and a load with said piston means supported by said frame and said sleeve means positioned under said load for raising said load through a limited vertical distance,*

*and a check valve assembly depending centrally from the underside of said piston means, said assembly having a diameter less than half the diameter of the frame upon which said piston means is supported for reception of said check valve assembly below the supporting level of said frame,*

*said check valve assembly including a hydraulic check valve providing an inlet for hydraulic fluid to said pressure chamber means and a check valve stem for operating said check valve, said stem extending vertically upward through said pressure chamber means into operative relation with said piston sleeve means for closing said check valve when said load raises through said limited vertical distance.*

*4. The device according to claim 3 further including an apertured base for said piston means for location between said piston means and said frame, with said check valve assembly extending downwardly through the aperture therein.*

*5. The device according to claim 4 further including a flexible dust baffle disposed around said sleeve means and attached both to said sleeve means and said base for closing the sliding juncture between said piston means and said sleeve means from the outside environment.*

*6. The device according to claim 4 wherein said base is provided with an upwardly extending cylindrical flange having a plurality of downwardly extending slots, and wherein the lower inside of said piston is provided with a stop selectively receivable in one of said slots.*

*7. The device according to claim 3 wherein said check valve is provided with means for yieldably urging said check valve toward a closed position while also urging said check valve stem toward said opposite wall of said piston sleeve means.*

*8. The device according to claim 7 further including yieldable means between said valve and said valve stem also normally urging said valve stem toward the opposite wall of said sleeve means while being compressible upon seating of said valve.*

*9. The device according to claim 3 further including yieldable means between said valve and said valve stem for compressing upon seating of said valve.*

*10. The device according to claim 3 wherein said valve comprises a valve seat in said check valve assembly and a valve head urged upwardly theretoward, said valve stem extending from said valve head upwardly against the opposite wall of said sleeve means for preventing closure of said valve head against said valve seat until said sleeve means has risen by said limited vertical distance under the pressure of hydraulic fluid passing through said valve.*

*11. The device according to claim 10 wherein a compressible seal is provided between said valve head and said valve seat, and further including compressible means between said valve head and said valve stem for compressing as said valve head is urged toward said valve seat with said compressible means therebetween.*

*12. The device according to claim 11 further including a chamber located on the upper side of said valve seat and plural passages between said chamber and the top of said piston means, said check valve assembly also being provided with a passage through which said valve stem extends into said pressure chamber means and against said piston sleeve means,*

*and a port communicating with said chamber to which a pressure measuring device is connectible.*

References Cited

The following references, cited by the Examiner, are of record in the patented file of this patent or the original patent.

UNITED STATES PATENTS

| | | | |
|---|---|---|---|
| 2,613,925 | 10/1952 | Weber | 177—141 UX |
| 2,662,539 | 12/1953 | Markson | 73—141 X |
| 2,956,761 | 10/1960 | Weber | 177—208 X |
| 3,082,836 | 3/1963 | Billman | 177—208 UX |
| 3,179,192 | 4/1965 | Link | 177—208 |
| 3,339,873 | 9/1967 | Hale | 254—93 X |

FOREIGN PATENTS

| | | | |
|---|---|---|---|
| 506,076 | 5/1920 | France | 177—208 |
| 1,041,812 | 10/1958 | Germany | 177—141 |
| 417,470 | 2/1967 | Switzerland | 177—208 |

ROBERT S. WARD, Jr., Primary Examiner

U.S. Cl. X.R.

177—141, 208; 73—141; 254—93